J. B. CRAIG.
Artificial Stems for Cut Flowers.

No. 144,446. Patented Nov. 11, 1873.

Witnesses:
G. Mathys
A. W. Hart

Inventor:
John B. Craig
Per
Attorneys.

UNITED STATES PATENT OFFICE.

JOHN B. CRAIG, OF PERRYSVILLE, PENNSYLVANIA.

IMPROVEMENT IN ARTIFICIAL STEMS FOR CUT FLOWERS.

Specification forming part of Letters Patent No. 144,446, dated November 11, 1873; application filed August 26, 1873.

*To all whom it may concern:*

Be it known that I, JOHN B. CRAIG, of Perrysville, in the county of Allegheny and State of Pennsylvania, have invented a new and Improved Device for Stemming Cut and Artificial Flowers; and I do hereby declare that the following is a full, clear, and exact description of the same, reference being had to the accompanying drawing forming a part of this specification.

It is the present practice of florists to stem flowers by attaching them to wooden splints by means of wire or thread. This mode of stemming is open to several objections, among the chief of which is consumption of time.

My improved device obviates the objections referred to, and is formed of a wire shaped spirally into the form of a hollow inverted cone, which is provided with a stem or shank, as hereinafter described.

Figure 1:
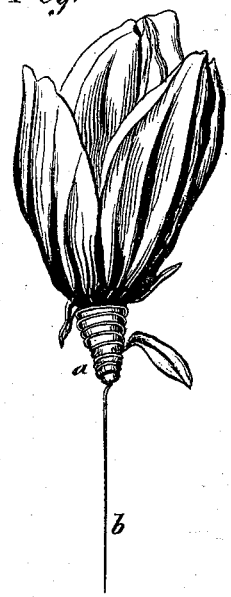
Figure 2:

In the drawing, Figure 1 shows my improved device applied to a flower, and Fig. 2 shows it detached.

To form the stemming device A, I take a piece of annealed gauze-wire of suitable length and shape it at one end into a hollow inverted cone, $a$, the body, or remaining portion of the wire, forming a stem or shank, $b$.

To attach the device to a flower, the stem is drawn down through the coil $a$ until the latter embraces the base of the calyx, when the cone is compressed by slight pressure between the thumb and finger, causing the wire to take a firm hold of the stem thereof.

Thus the flower is securely attached to the spiral coil, while the stem $b$ of the latter, being flexible, may be conveniently attached to the object designed to be ornamented, or conjoined with others to form a bouquet, wreath, or other floral design.

The rapidity with which the device can be manufactured renders its cost trifling.

Having thus described my invention, what I claim as new, and desire to secure by Letters Patent, is—

The device A for stemming flowers, consisting of a wire-coil, $a$, and stem $b$, as shown and described.

JOHN B. CRAIG.

Witnesses:
 HENRY P. HADLEY,
 CHARLES C. WALLACE.